(12) United States Patent
Clark, II et al.

(10) Patent No.: US 11,109,016 B2
(45) Date of Patent: Aug. 31, 2021

(54) METHODS AND APPARATUS FOR ERROR DETECTION IN AN IMAGING SYSTEM

(71) Applicant: SEMICONDUCTOR COMPONENTS INDUSTRIES, LLC, Phoenix, AZ (US)

(72) Inventors: Airell Richard Clark, II, Albany, OR (US); Dwight Poplin, Philomath, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 600 days.

(21) Appl. No.: 15/263,110

(22) Filed: Sep. 12, 2016

(65) Prior Publication Data

US 2017/0272740 A1 Sep. 21, 2017

Related U.S. Application Data

(60) Provisional application No. 62/309,878, filed on Mar. 17, 2016.

(51) Int. Cl.
*H04N 5/357* (2011.01)
*H04N 17/00* (2006.01)
*H04N 5/217* (2011.01)

(52) U.S. Cl.
CPC .......... *H04N 17/002* (2013.01); *H04N 5/357* (2013.01)

(58) Field of Classification Search
CPC .. H04N 5/367; H04N 5/23241; H04N 17/004; H04N 19/124; H04N 17/002; H04N 5/357; G06K 9/00; G06N 3/02; G06N 3/08; G06T 7/254

USPC .................. 348/246; 382/100, 104; 375/240, 375/240.26, 240.12, 240.27

See application file for complete search history.

(56) References Cited

U.S. PATENT DOCUMENTS

| | | | | |
|---|---|---|---|---|
| 4,590,520 A | * | 5/1986 | Frame | H04N 5/367 348/616 |
| 6,707,493 B1 | * | 3/2004 | Lee | H04N 5/367 348/246 |
| 6,781,637 B2 | | 8/2004 | Kimura | |
| 6,940,516 B1 | * | 9/2005 | Dotson | G09G 5/06 345/503 |
| 2002/0057238 A1 | * | 5/2002 | Nitta | G09G 3/3648 345/87 |
| 2005/0212932 A1 | * | 9/2005 | Steimle | H04N 5/23241 348/246 |
| 2010/0119210 A1 | | 5/2010 | Kusunoki | |
| 2010/0218016 A1 | | 8/2010 | Konno | |
| 2012/0082343 A1 | | 4/2012 | Schoeberl | |
| 2013/0113953 A1 | * | 5/2013 | Nagel | H04N 7/183 348/222.1 |

(Continued)

*Primary Examiner* — Albert Kir
(74) *Attorney, Agent, or Firm* — Noblitt & Newson, PLLC; Gary W. Newson

(57) ABSTRACT

Various embodiments of the present technology may comprise methods and apparatus for error detection in an imaging system. The method and apparatus may comprise pixels arranged in rows and columns and an error detection circuit receiving pixel data generated by the pixels. The error detection circuit may detect errors and generate an error condition and/or signal, for example if one or more image frames are the same and/or a readout error has occurred.

14 Claims, 10 Drawing Sheets

(56) References Cited

U.S. PATENT DOCUMENTS

| | | | |
|---|---|---|---|
| 2013/0136309 A1* | 5/2013 | Zhang | ............... G06T 7/246 382/104 |
| 2014/0325274 A1 | 10/2014 | Mueller | |
| 2015/0062614 A1 | 3/2015 | Takatani | |
| 2016/0117557 A1* | 4/2016 | Bettagere | ............ H04N 17/004 382/100 |

* cited by examiner

METHODS AND APPARATUS FOR ERROR DETECTION IN AN IMAGING SYSTEM

CROSS-REFERENCE TO RELATED APPLICATION

This application claims the benefit of U.S. Provisional Patent Application Ser. No. 62/309,878, filed on Mar. 17, 2016, and incorporates the disclosure of the application in its entirely by reference. To the extent that the present disclosure conflicts with any referenced application, however, the present disclosure is to be given priority.

BACKGROUND OF THE TECHNOLOGY

Control systems, such as an Advanced Driver Assistance System (ADAS) in the automotive industry, depend on real-time imaging subsystems to provide reliable data in order to perform effectively. As such, automotive manufacturers request that certain procedures, for example the Automotive Safety Integrity Level, are followed to certify that their products will remain safe, despite potential failures of individual components.

Vehicles equipped with an ADAS utilize imaging systems to capture and process image data. After the image data is processed, it is transmitted to an embedded system where the data is acted on and instructions are transmitted to other peripheral systems, such as the braking system and/or driver display system. When the image data is incomplete or contains errors, the embedded system may make decisions based on the incomplete or incorrect data, which may result in the vehicle performing functions and/or actions that are inconsistent with the actual environment.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 9A:
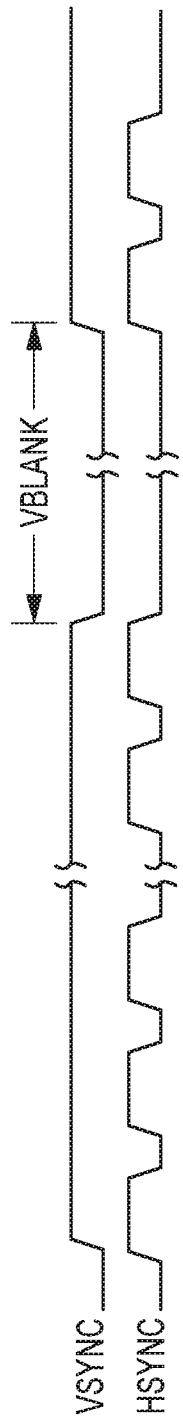
Figure 9B:
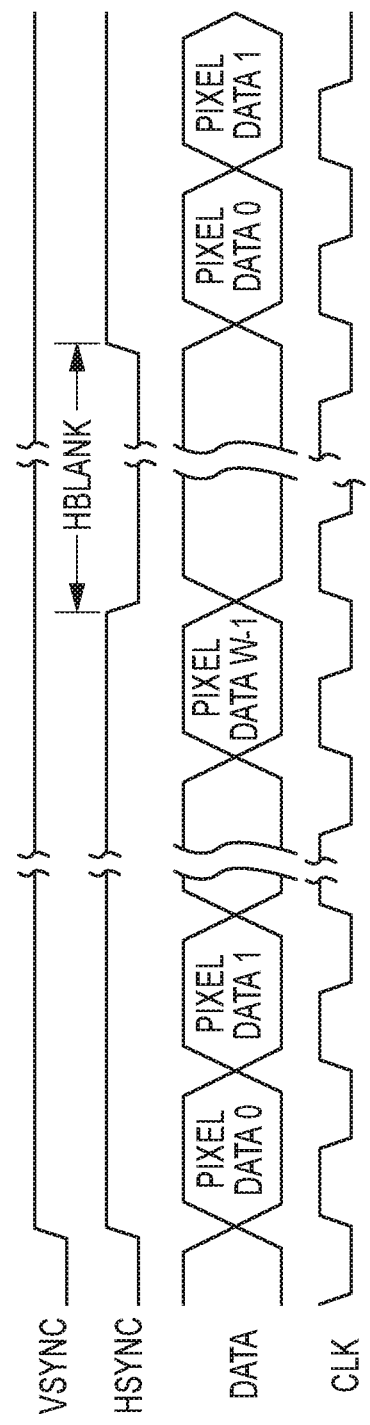
Figure 10:
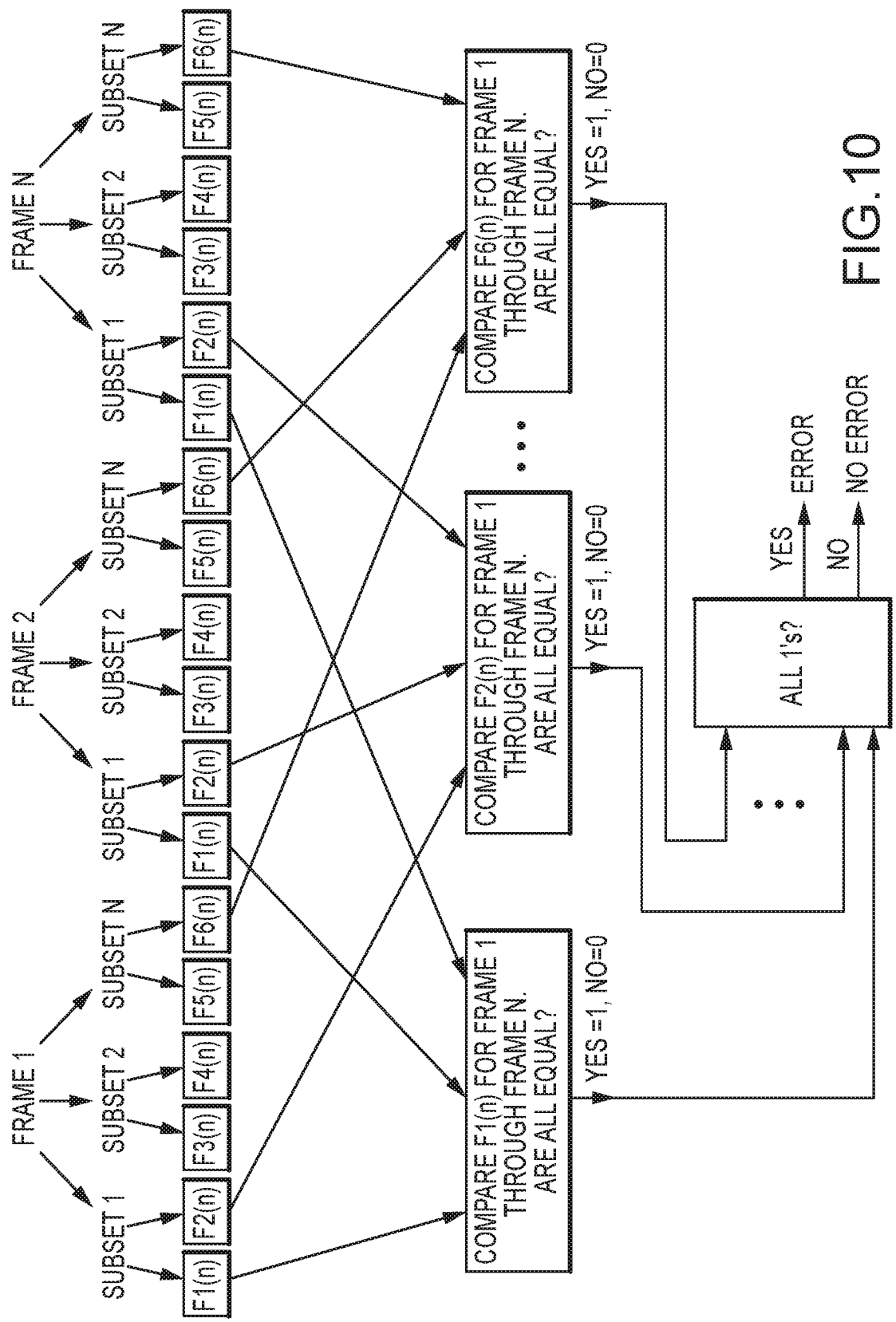

FIGS. 9A-B are timing diagrams in accordance with an exemplary embodiment of the present technology; and FIG. 10 is a flow chart in accordance with an exemplary embodiment of the present technology.

SUMMARY OF THE INVENTION

Various embodiments of the present technology may comprise methods and apparatus for error detection in an imaging system. The method and apparatus may comprise pixels arranged in rows and columns and an error detection circuit receiving pixel data generated by the pixels. The error detection circuit may detect errors and generate an error condition and/or signal, for example if one or more image frames are the same and/or a readout error has occurred.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various imagers, processing techniques, embedded systems, and the like, which may carry out a variety of functions. In addition, the present technology may be practiced in conjunction with any number of control systems and the apparatus described are merely exemplary applications for the technology. Further, the present technology may employ any number of conventional techniques for capturing image data, sampling image data, readout of image data, processing image data, and the like.

Methods and apparatus for error detection in an imaging system according to various aspects of the present technology may operate in conjunction with any suitable control system, such as a video system, machine vision, vehicle system, surveillance system, and the like.

Figure 1:
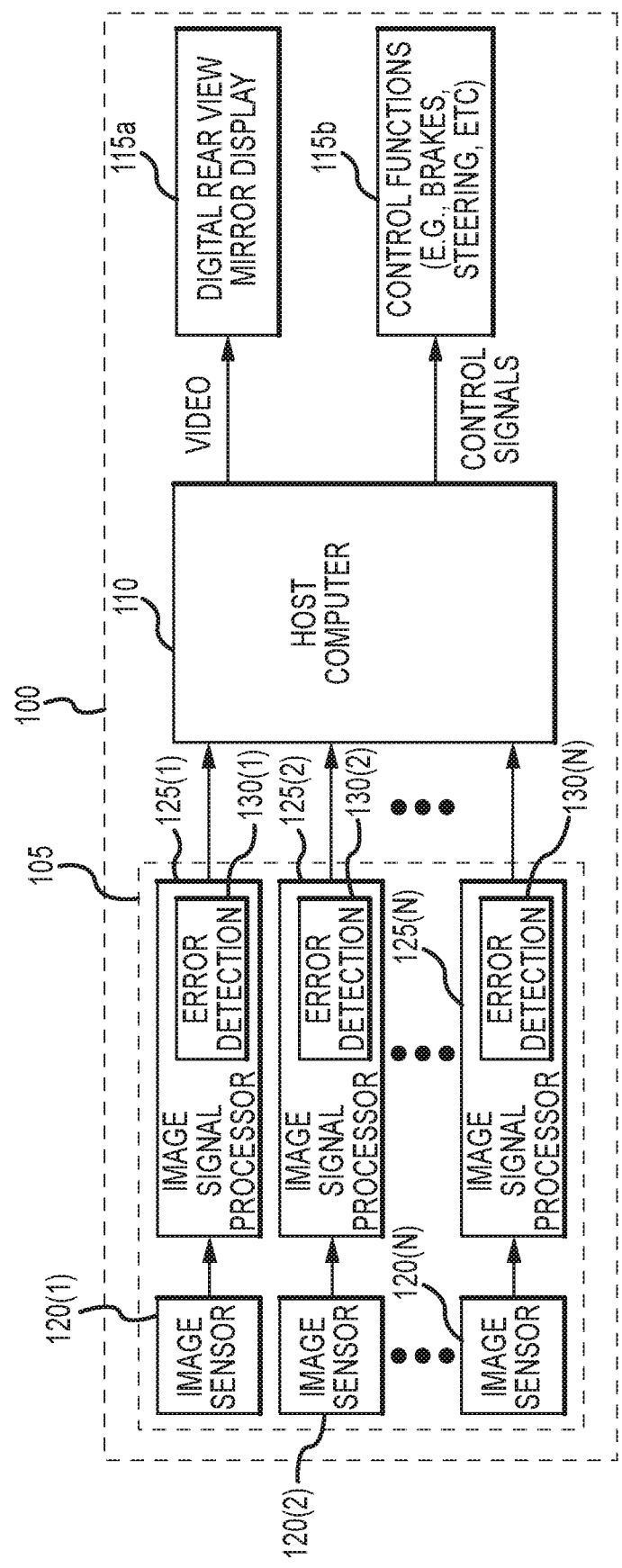
FIG. 1 is a block diagram of a system in accordance with an exemplary embodiment of the present technology.

Referring to FIG. 1, a control system 100 according to various aspects of the present invention, for example for a vehicle system equipped with an ADAS, may comprise an imaging system 105, an embedded system 110, and a peripheral system 115. The control system 100 may coordinate vehicle functions and/or automate vehicle control and operation to increase car safety and road safety. Safety features may be designed to avoid collisions and accidents by alerting the driver to potential problems, or to avoid collisions by implementing safeguards and taking over or supplementing control of the vehicle.

The embedded system 110 may receive information from the image signal processor 125, such as digital image data, message data, and the like, and react with signals to the peripheral system 115, such as to communicate with and control various peripheral systems 115. The embedded system 110 may comprise any suitable system for interacting with the peripheral system 115 according to the information from the image signal processor 125. For example, the embedded system may comprise a host computer with a central processing unit (CPU). The embedded system 110 may also comprise a memory device, for example, a random access memory (RAM). Alternatively, the embedded system 110 may comprise a dedicated controller, a logic array, an ASIC, and/or other suitable hardware and/or software configured to interact with the peripheral system 115 according to signals from the image signal processor 125.

The peripheral system 115 may comprise any appropriate system that performs functions in the relevant environment according to signals from the embedded system 110, such as vehicle control systems and driver interface systems. In an exemplary embodiment, the control system 100 comprises multiple peripheral systems 115, each performing different functions. Such peripheral systems 115 may comprise driver displays and/or alerts 115a, for example a digital rear view mirror display, and/or other vehicle control systems 115b, for example a braking system, steering system, and the like.

In various embodiments, the imaging system 105 may comprise an image sensor 120 and an image signal processor 125 for capturing and processing image data. In an exemplary embodiment, the imaging system 105 comprises one or more image sensors 120(1), 120(2) . . . 120(N) for capturing image data from different angles and/or directions. For example a first image sensor 120(1) may be positioned at the front of a vehicle, and a second image sensor 120(2) may be positioned at the rear of the vehicle. In an embodiment comprising multiple image sensors 120(1), 120(2) . . . 120(N), each image sensor may be coupled to a dedicated image signal processor 125(1), 125(2) . . . 125(N). Alternatively, multiple image sensors 120 may share one or more image signal processors 125.

In various embodiments, the image sensor 120 may capture image data. For example, light may enter the imaging system through a lens and strike the image sensor 120. The image sensor 120 may detect and convey the information that constitutes an image, such as by converting the variable attenuation of waves (as they pass through or reflect off objects) into electronic signals. The image sensor 120 may be implemented in conjunction with any appropriate technology, such as using semiconductor charge-coupled devices (CCD), active pixel sensors in complementary metal-oxide semiconductors (CMOS), analog sensors, and/or flat panel detectors.

Figure 2:
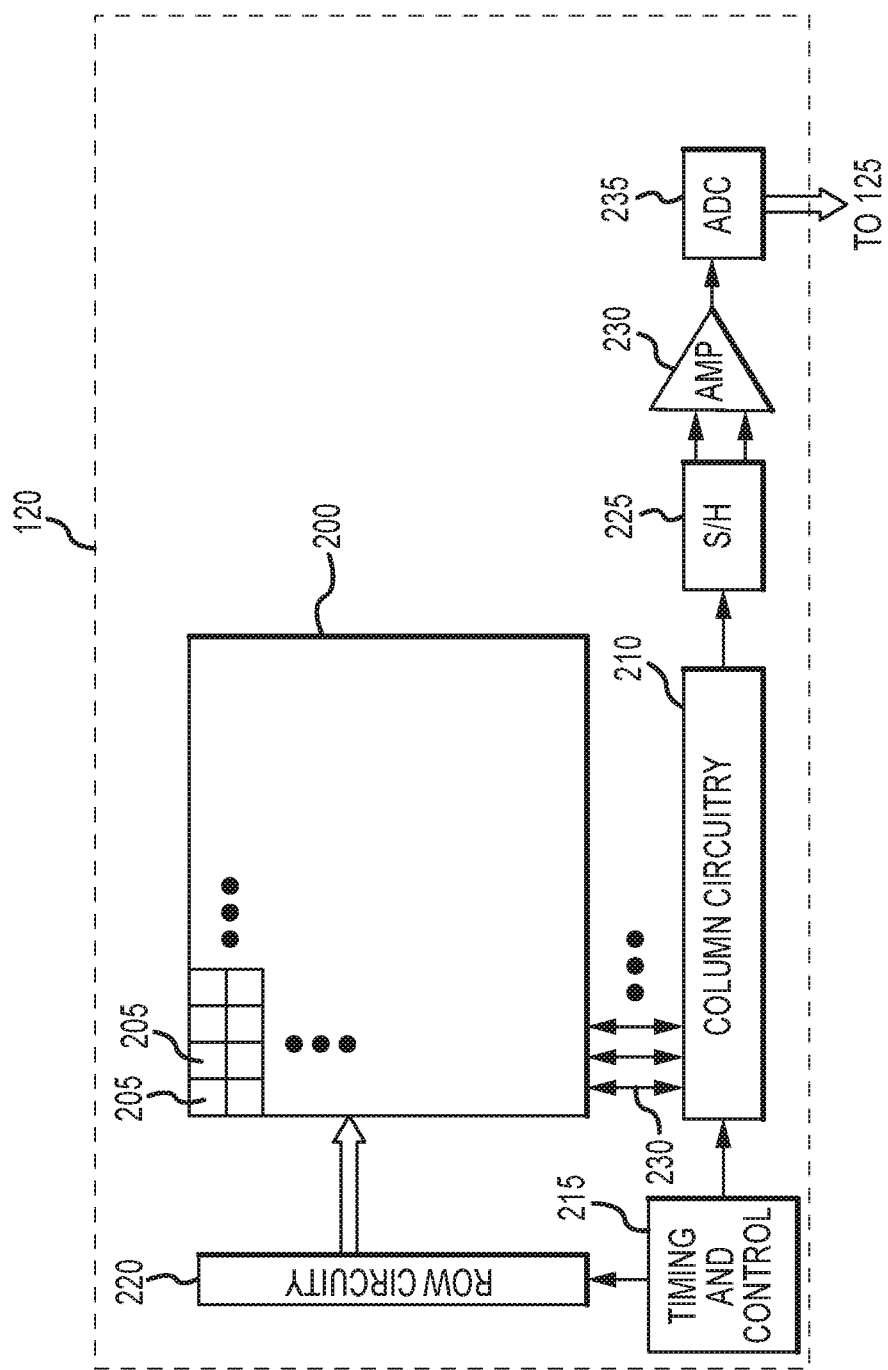
FIG. 2 is a block diagram of an image sensor in accordance with an exemplary embodiment of the present technology.

Referring to FIG. 2, in various embodiments, the image sensor 120 may comprise a pixel array 200 comprising a plurality of pixels 205 arranged in rows and columns. Each pixel 205 of the image sensor 120 samples a portion of the image and generates a corresponding signal. Each pixel 205 may comprise a photosensitive element, such as a photodiode, a photogate, or other semiconductor device responsive to light, to convert light into an electric charge. In various embodiments, the photosensitive element may comprise a pinned photodiode capable of being fully depleted at a depletion voltage. The pixels 205 may be electrically connected via metal wirings or other suitable connections. The pixel array 205 may contain any number of pixels 205, for example, hundreds, thousands, or even millions of pixels 205. The image sensor 120 may be formed utilizing any suitable fabrication technology and/or process.

In various embodiments, the image sensor 120 may further comprise row circuitry 220, column circuitry 210, and a timing and control unit 215, for selectively activating sequential rows of pixels to be read out. The row circuitry 220 may receive row addresses from the timing and control unit 215 and supply corresponding row control signals, such as reset, row select, charge transfer, and readout control signals to the pixels 205.

The column circuitry 210 may comprise column control circuitry, readout circuitry, processing circuitry, and column decoder circuitry, and may receive image signals, such as analog pixel signals generated by the pixels 205. Column paths 230 may be configured to couple each column of the pixel array 200 to the column circuitry 210. The column paths 230 may be used for reading out image signals from the pixel 205 and/or supplying bias signal (e.g. bias current or bias voltages).

After the pixel signals are read out, they may be transmitted to a sample-and-hold circuit 225. The pixel signals may then be transmitted to an amplifier 230 to amplify the signal prior to being converted to a digital signal by an analog to digital converter 235. The digital pixel data may then be transmitted to and stored in or by an image signal processor 125 for further processing.

Referring again to FIG. 1, in various embodiments, the image signal processor 125 may perform demosaicing and/or other functions, such as autofocus, exposure, noise reduction, and white balance. The image signal processor 125 may comprise any number and type of devices, such as transistors, capacitors, and the like, for performing calculations, transmitting and receiving image pixel data, and storing image pixel data, such as in a memory. In various embodiments, the image signal processor 125 may be implemented with a programmable logic device, such as a field programmable gate array (FPGA) or any other device with reconfigurable digital circuits. In other embodiments, the image signal processor 125 may be implemented in hardware using non-programmable devices. In various embodiments, the image signal processor may comprise a memory device (not shown), for example, a frame buffer or line buffers, to temporarily store image data.

In an exemplary embodiment, the image signal processor 125 may be formed on a companion chip which is coupled to the image sensor via wired connections. In alternative embodiments, the image signal processor 125 may be formed entirely on the same an integrated circuit as the pixel array 200. The integrated design may be selected according to a particular application.

In various embodiments, the image signal processor 125 may comprise an error detection circuit 130 for detecting and reporting errors within the imaging system 105. For example, errors may be the result of faulty readout, resulting in duplication of one or more image frames and/or read out of only a portion of the frame data, and/or a circuit failure within the memory device of the image signal processor 125 may cause previous frame data to be read out, when current frame data should be read out.

Figure 3:
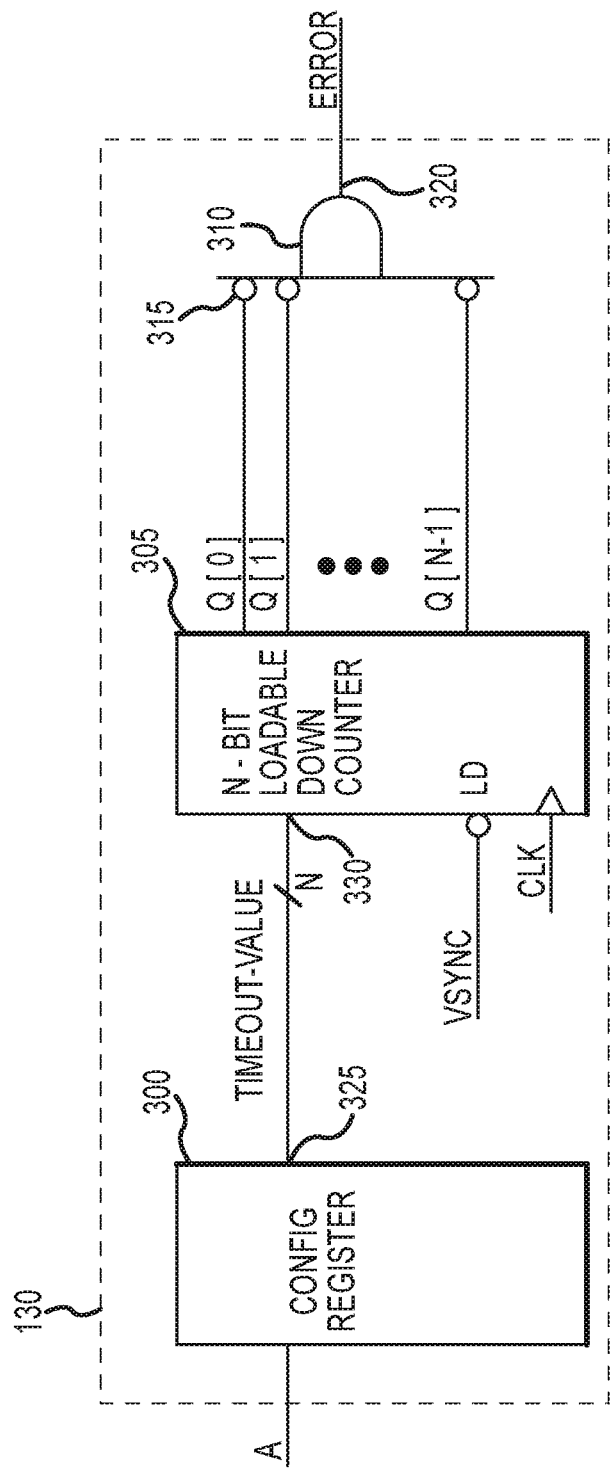
FIG. 3 is a schematic diagram of an error detection circuit in accordance with an exemplary embodiment of the present technology.

Referring to FIG. 3, in one embodiment, the error detection circuit 130 detects when the number of pixels 205 read out is greater than the number of pixels 205 in the pixel array 200. In real-time operations, it is desirable to utilize "live" image data, so if imaging system 105 reads out a number of pixels 205 that is greater than the number of pixels 205 in the pixel array 200, then this suggests that some of the pixel data has been repeated, and therefore not "live." In an exemplary embodiment, the error detection circuit may count the number of pixels that are read out and generate an error condition if the number of pixels 205 read out is greater than the total number of pixels 205 in the pixel array 200.

In an exemplary embodiment, the error detection circuit 130 may comprise a configuration register 300 and a counter 305. The configuration register 300 may be programmed with a timeout value A which may be greater than or equal to the number of clock cycles needed to transmit the pixel data for all pixels 205 in the pixel array 200. The configuration register 300 may transmit the timeout value to the counter 305, for example via an output terminal 325 coupled to an input terminal 330 of the counter 305. The counter 305 may be enabled with a vertical sync signal VSYNC and may also receive a clock signal CLK to begin the period for counting the number of pixels that are read out on a per frame basis. An output Q of the counter 305 may be coupled to an input terminal 315 of a logic gate 310, wherein an output 320 of the logic gate 310 may generate an error condition if the number of pixels 205 read out is greater than the total number of pixels 205 in the pixel array 200. In various embodiments, the error condition may activate a response, for example the response may initiate a process to capture new image data for processing, and/or to prevent the embedded system 110 from using a frame which does not represent "live" image data.

Alternatively, the configuration register 300 may be programmed with a timeout value A which is greater than or equal to the number of clocks needed to transmit the pixel data for one row of pixels 205 in the pixel array 200. In this case, the counter 305 may be enabled with a horizontal sync signal HSYNC along with the clock signal CLK to begin the period for counting the number of pixels that are read out on a per row basis.

Figure 4:
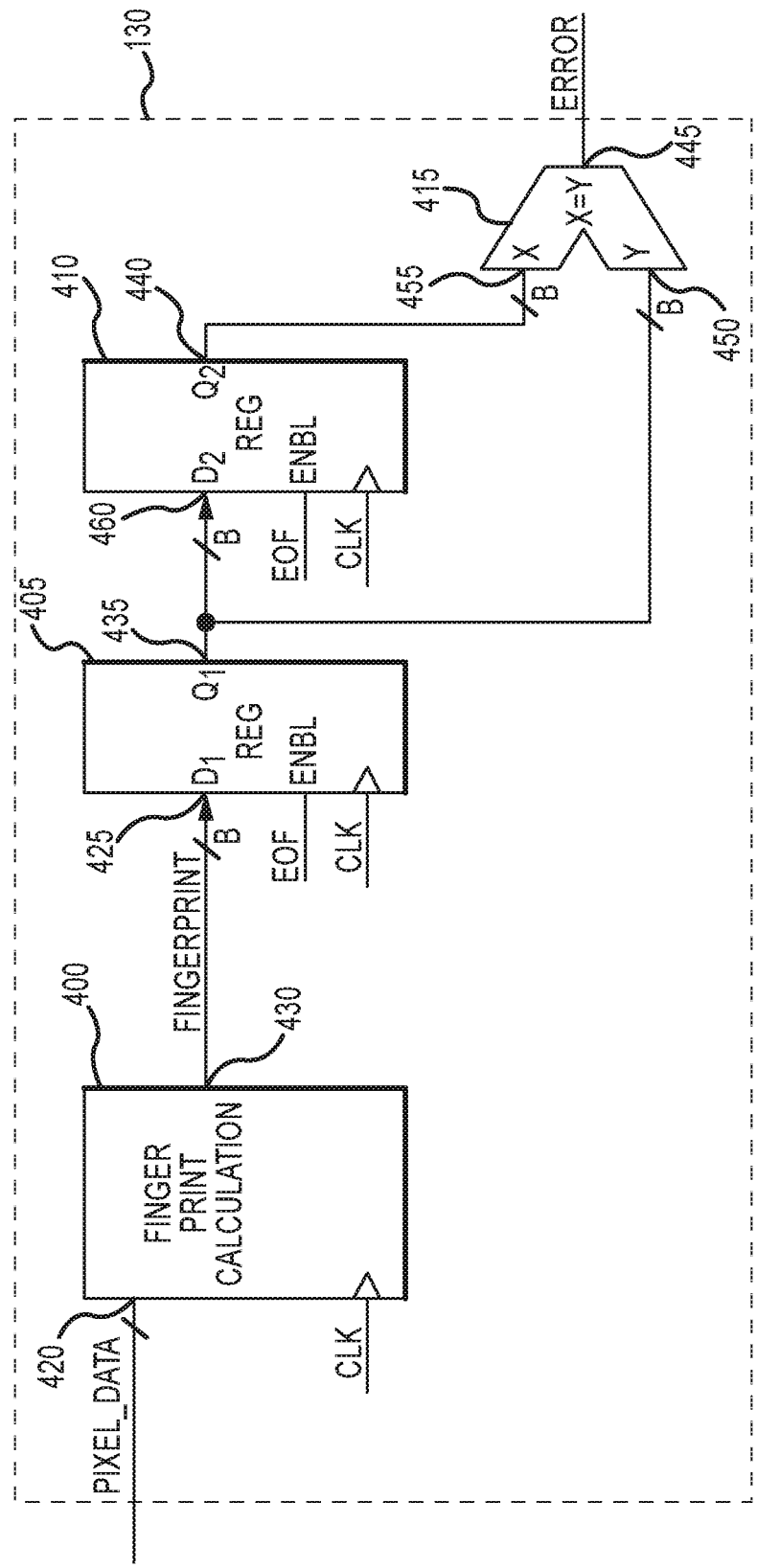
FIG. 4 is a schematic diagram of an error detection circuit in accordance with an exemplary embodiment of the present technology.

In another embodiment and referring to FIG. 4, the error detection circuit 130 may generate and assign a non-random unique identifier based on the relevant pixel data, also referred to as a fingerprint F(n). The error detection circuit 130 may generate the fingerprint F(n) by utilizing a fingerprinting algorithm that maps a specified portion of pixel data to a short bit string that uniquely identifies that portion of the pixel data. The fingerprint F(n) may be assigned to an entire frame of pixel data or may be assigned to portions of the pixel data resulting in multiple fingerprints F/ 1(n):FN(n), such as a subset of bits taken from each pixel, the pixel data from odd-numbered rows or columns, the pixel data from a predetermined window, and the like.

In the present embodiment, the error detection circuit 130 may comprise a fingerprint calculation unit 400 to calculate the fingerprint F(n) utilizing conventional fingerprinting methods and/or algorithms. For example, the fingerprint calculation unit 400 may use Rabin's fingerprinting algorithm, a cyclical redundancy check function, a function that sums all the pixels or a portion of the pixels, and the like. Desirable characteristics of a fingerprint algorithm and/or function may include: 1) the number of calculations are minimal; 2) the algorithm will detect differences between two or more images if the images differ by only one bit; 3) for an N-bit fingerprint, the fingerprint values should be distributed over the $2^N$ possible outputs to maximize the probability that unique images generate unique fingerprint values. The error detection unit may further comprise first and second registers 405, 410 to store digital values, and a comparator 415.

In the present embodiment, the fingerprint calculation unit 400 may receive pixel data at an input terminal 420. The fingerprint calculation unit 400, and the first and second registers 405, 410 may be coupled in series. For example, an input terminal 425 of the first register 405 may be coupled to an output terminal 430 of the fingerprint calculation unit 400, and an output terminal 435 of the first register 405 may be coupled to an input terminal 460 of the second register 410. The comparator may comprise input terminals 450, 455 coupled to one of the output terminals 435, 440 of each of the first and second registers 405, 410, respectively. The comparator 415 may compare two input values X, Y (i.e., the values stored in the first and second registers 405, 410) to determine if they are equal. If the system is working properly, different pixel data, and thus different fingerprints, are expected. As such, if the two input values X, Y are equal, this may suggest that both input values X, Y represent the same pixel data, rather than different pixel data. Therefore, if the pixel data produces identical fingerprints, the system may interpret this as an error condition. Even images taken of still scenes produce different fingerprints due to noise variations within the signals. In various embodiments, the error condition may activate a response, for example the response may initiate a process to capture new image data for processing, and/or to prevent the embedded system 110 from using a frame which does not represent "live" image data.

Figure 5:
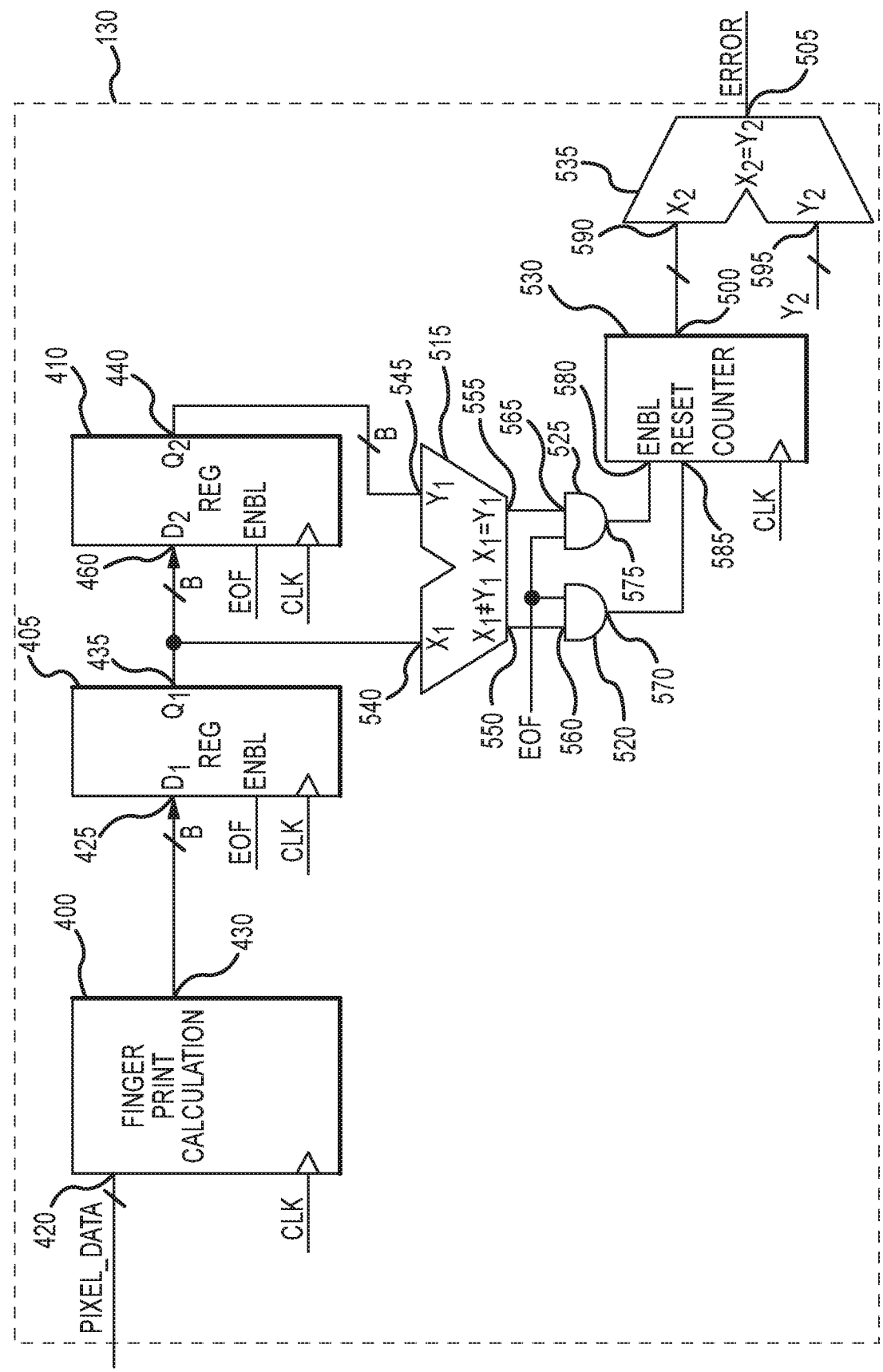
FIG. 5 is a schematic diagram of an error detection circuit in accordance with an exemplary embodiment of the present technology.

In another embodiment and referring to FIG. 5, the error detection circuit 130 may generate and assign a fingerprint F(n) utilizing the fingerprint calculation unit 400, as described above. The present embodiment may comprise the first and second registers 405, 410 to store digital values, wherein the fingerprint calculation unit 400 and the first and second registers 405, 410 may be coupled in series. For example, an input terminal 425 of the first register 405 may be coupled to an output terminal 430 of the fingerprint calculation unit 400, and an output terminal 435 of the first register 405 may be coupled to an input terminal 460 of the second register 410. The error detection circuit 130 may further comprise a first comparator 515 to compare two input values X1,Y1, a second comparator 535 to compare two input values X2,Y2, a counter 530, and first and second AND gates 520, 525. Each of the first and second AND gates 520, 525 may comprise input terminals and an output terminal.

In the present embodiment, input terminals 540, 545 of the first comparator 515 may be coupled to the output terminals 435, 440 of each of the first and second registers 405, 410. The first comparator 515 may comprise first and second output terminals 550, 555, wherein a first output terminal 550 is coupled to an input terminal 560 of the first AND gate 520, and the second output terminal is coupled to an input terminal 565 of the second AND gate 525. The output terminals 570, 575 of the first and second AND gates 520, 525 may be coupled to input terminal 580, 585 of the counter 530. In the present embodiment, the second comparator 535 comprises two input terminals, wherein a first input terminal 590 is coupled to an output terminal 500 of the counter 530 and the second input terminal 595 may be a predetermined parameter Y2. The second comparator 535 may comprise an output terminal 505 to generate an error condition. In various embodiments, the error condition may activate a response, for example the response may initiate a process to capture new image data for processing, and/or to prevent the embedded system 110 from using a frame which does not represent "live" image data.

Advantages of the various embodiments may relate to reducing the probability of false positives (i.e., where an error condition is generated, but there isn't an actual error). For example, in a case where two fingerprints are compared, it is possible that two non-identical images (i.e. two images which differ in at least one pixel value) could nonetheless produce the same digital fingerprint F(n). In this case an error would be detected where none exists. Digital fingerprint algorithms are designed to minimize the probability of this type of failure. But the fingerprint F(n) is represented by a finite number of bits, B. This means that the fingerprint F(n) has only $2^B$ possible values. A 1080 p color image with 24 bits per pixel (8 bits for each red, green, and blue components) has $2^{(24 \times 1920 \times 1080)}$ permutations, which is an astronomically large number. Even if the range of images is limited to those that contain physical scenes (and not random noise) the number of possible permutations is still astronomically large. This means that for each of the $2^B$ possible values of the fingerprint F(n), a large number of non-identical images will be mapped to a particular value. Therefore, statistically, there is good chance that non-identical image pairs will produce false identical fingerprints.

The probability of producing a false identical fingerprint (PFIF), can be estimated by viewing the fingerprint F(n), as a random number. The probability that a random number represented in B bits repeats on successive frames is 1 in $2^B$. If, for example, a 32-bit cyclical redundancy check (CRC) is used as the fingerprint function, PFIF can be estimated as 1 in $2^{32}$ or 1 in 4,294,967,296. While this probability may seem acceptably low, in some applications it is still too high. An imaging system (e.g., a camera) that is operated at 30 frames per second produces 108,000 images per hour (30 frames/second×3600 seconds/hour). Over the course of several years and continuous operation, it would produce billions of images. If a 32-bit fingerprint F(n) was used in such an application, PFIF for a single camera during its lifetime would be very close to 1. For a camera product where millions of units are deployed, PFIF must be reduced by many orders of magnitude below that of a 32-bit CRC. As such, PFIF could be reduced by increasing the number of bits for the fingerprint. Depending on the fingerprint algorithm used, however, the additional hardware utilized to expand the fingerprint F(n) might grow at a rate that is larger than the increase in the number of bits.

An alternative way to reduce PFIF is to compare the fingerprints F1(n):FN(n) for N successive images (where N is greater than two) and to only detect an error if all of the images have the same fingerprint (i.e., F1(n)= . . . =FN(n), etc).

Similarly, and referring to FIG. 10, PFIF may be reduced even further by computing multiple fingerprints for different subsets of the same image and comparing the fingerprints for each subset in two or more consecutive images. Each subset may use the same fingerprint algorithm, or alternatively, each subset may use a different fingerprint algorithm. In the case where the fingerprint calculation unit 400 returns a false positive for one subset, a different subset may detect a difference between the images. The probability that all subsets return a false positive on the same pair of images or N-consecutive images can be reduced substantially by increasing the number of subsets. Therefore, to reduce false positives, an error condition would be generated only if all subsets return the same values for two or more consecutive images. The number of images N, number of subsets, and number of fingerprints F(n) generated for each subset may be selected according to a particular application or desired minimum PFIF.

Figure 6:
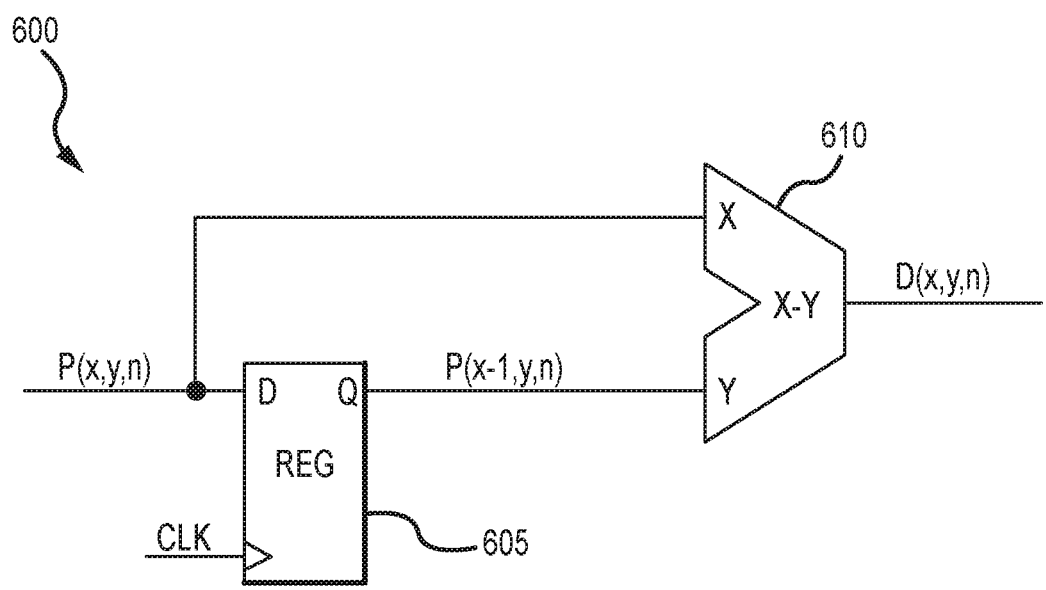
FIG. 6 is a schematic diagram of an error detection circuit in accordance with an exemplary embodiment of the present technology.

Referring to FIG. 6, in various embodiments, the pixel data may undergo preprocessing to improve the results of the fingerprint calculation. As described above, the imaging system 105 can produce a large number of combinations of digital numbers. Since an image, with image data P(x,y,n), has a high autocorrelation, data from adjacent pixels 205 are likely to have similar values that are very close to each other or identical. As such, data from adjacent pixels 205 may have a difference value (a horizontal difference image D(x, y,n)) near zero. The horizontal difference image data D(x, y,n) would have a reduced range compared to the image data P(x,y,n), since there are fewer combinations of digital fingerprints F(n) that can be generated, and temporal noise in the "n" dimension would be larger relative to the image. As such, if the pixel data is preprocessed, calculating the fingerprint F(n) using the horizontal difference image data D(x,y,n) may result in reduced PFIF.

Preprocessing may be realized by a circuit 600 comprising a register 605 and a subtraction unit 610 to produce the horizontal difference image D(x,y,n). In an exemplary embodiment, the circuit 600 may compute the horizontal difference image data D(x,y,n) by subtracting the image data P(x,y,n) from an offset image data P(x-1, y,n), (i.e., D(x,y, n)=P(x,y,n)−P(x-1, y,n)). In the present embodiment, the register 605 may receive the image data P(x,y,n) and output the offset image data P(x-1,y,n). The subtraction unit 610 may receive the image data P(x,y,n) and the offset image data P(x-1,y,n) as inputs and subtract the two values to produce the horizontal difference image data D(x,y,n). The fingerprint calculation unit 400 may then generate and assign a fingerprint F(n) to the horizontal difference image data D(x,y,n).

In another embodiment, the error detection circuit 130 may detect unintended activation of a minoring function within a camera and/or the system. During normal operation, the minoring function may be used in conjunction with a user display and a back-up camera affixed to the rear of a vehicle to assist a driver in back-up operations and/or to alert the driver to oncoming traffic and other objects behind the vehicle. The design of a backup camera is distinct from other cameras in that the image is horizontally flipped (i.e., the minoring function) so that the output is a mirror image. This function is necessary because the camera and the driver face opposite directions, and without it, the camera's right would be on the driver's left and vice versa. A mirrored image makes the orientation of the user display consistent with the physical mirrors installed on the vehicle.

Unintended activation of the minoring function, however, may generate faulty data and/or instructions used by vehicle's control system 100. For example, it may cause the control system 100 to initiate a left turn when the scene captured by the image sensor 120 indicated that the vehicle should be turning right. The mirroring function may be inadvertently enabled by a stray alpha particle or may be the result of a CPU crash, where the CPU begins writing random data to its registers.

In various embodiments, the image signal processor 125 may be equipped with a motion estimation unit (not shown) to perform motion estimation of objects between image frames. Motion estimation is performed in image compression and in other imaging algorithms where objects in an image sequence must be examined and compared. Since objects can move between frames, it is important to try to estimate how far the objects have moved and in which direction.

The output of the motion estimation unit may comprise one or more vectors that estimate the motion of various objects within an image. The motion vectors estimate the motion that has occurred since the previous frame or over the last several frames. In an automotive application, if the vehicle turns to the right the motion vectors indicate objects in the image move to the left and vice versa. For example, if the mirroring function is not enabled, the control system 100 may utilize a video sequence to instruct the vehicle to make a right turn. As the vehicle begins to execute the turn, the motion vectors will indicate that objects in the scene are moving to the left. The fact that objects in the captured video are moving in the opposite direction to the turn is a confirmation that mirroring function is not enabled.

Conversely, if the mirroring function has been inadvertently enabled, the same circumstances that would instruct the vehicle to turn right in the absence of horizontal mirroring would instead instruct the vehicle to turn left. As the vehicle begins to execute the left turn, objects in the captured image will also move to the left. The fact that objects in the image are moving in the same direction as the vehicle is turning is an indication that mirroring function is enabled.

In other cases where the vehicle is not turning, the motion vectors may indicate that no motion occurred, or the motion vectors might be mixed, indicating that different objects in a scene moved different distances and/or directions.

In various embodiments, the motion estimation unit may utilize the set of motion vectors generated from a video sequence to determine information about the movement and/or position of the vehicle. For example, such information may indicate that the vehicle is making a right turn (objects in the scene moving left), a left turn (objects in the scene moving right), or no turn. The motion estimation unit may then compare the information to an output of the control system 100. The error detection circuit 130 may generate an error condition if the motion vectors generated by the image signal processor 125 indicate that the vehicle is turning in a direction opposite of that which the control system 100 intended.

Referring to FIGS. 9A-B, image pixels comprising pixel data are scanned out according to a predefined timing operation. In various embodiments, the pixels in one frame are scanned out one row at a time from top to bottom and left to right. For each row, the horizontal sync signal HSYNC is high when pixels for one line are being read out. At the end of each row, the horizontal sync signal HSYNC is low until the next row readout begins. The period when the horizontal sync signal HSYNC is low may be referred to as a horizontal blanking period HBLANK. The vertical sync signal VSYNC remains high during the readout of the entire frame.

Readout between image frames may comprise a vertical blanking period VBLANK. After the last row of the frame is read out, the vertical sync signal VSYNC is low and goes high again when read out of a subsequent frame begins. The period between the readout of two image frames when the vertical sync signal VSYNC is low may be referred to as the vertical blanking period.

Figure 7:
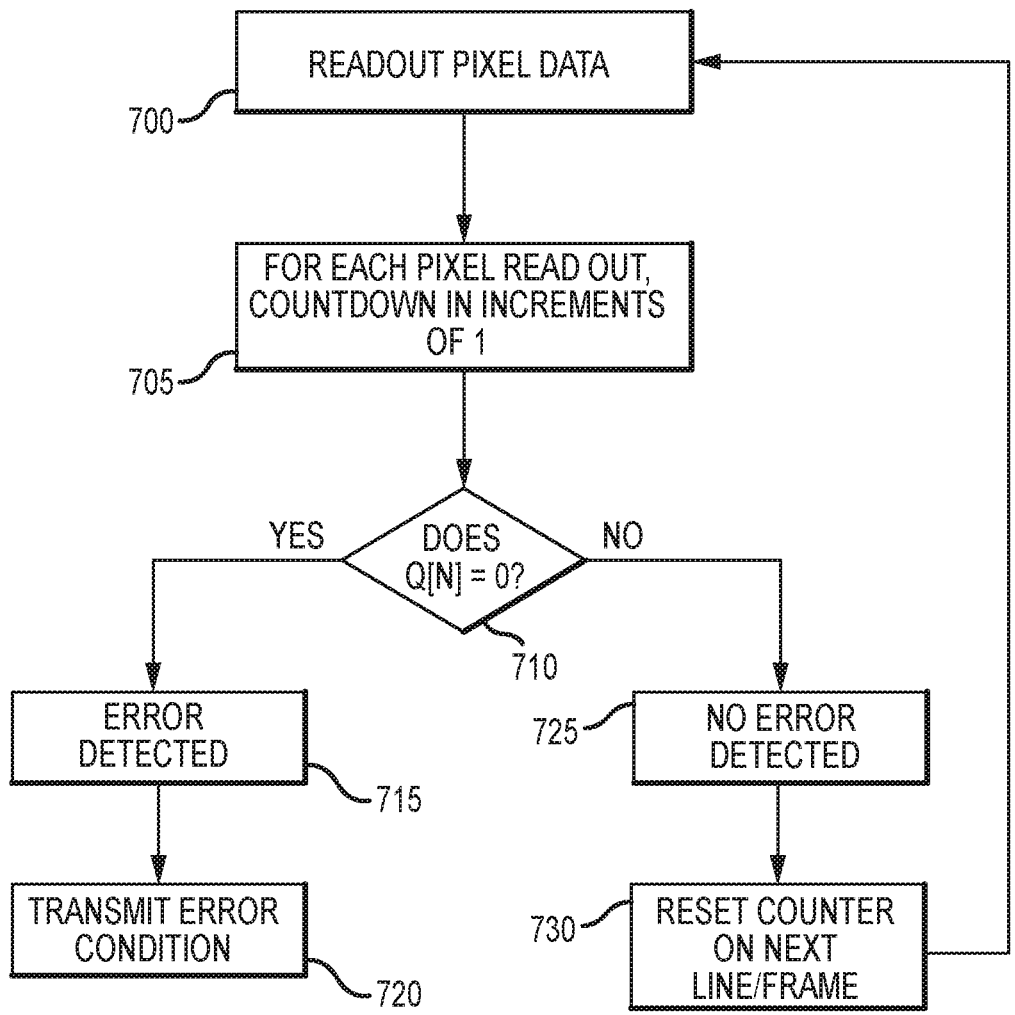
FIG. 7 is a flow chart in accordance with an exemplary embodiment of the present technology.

In operation and referring to FIGS. 3 and 7, the configuration register 300 may be programmed with the timeout value A prior to pixel readout. The timeout value A is greater than the number of clock cycles required to read out all of the pixels 205 in one frame. Generally, one pixel is read out per clock cycle, so the time out value A will be greater than the number of pixels 205 in one frame. While the vertical sync signal VSYNC is low, the timeout value A may be loaded into the counter 305. When the vertical sync signal VSYNC goes high, the pixels begin to readout (700) and the counter 305 starts counting down (705). If the counter 305 counts down to zero (710), the output Q will have all zeros, which is also the input to the logic gate 310, and the logic gate 310. In this case, if the output Q equals zero, then the number of pixels 205 read out is greater than the timeout value A, which suggests an error condition (715), since the expected number of readout pixels 205 should be less than the timeout value A. As such, if more pixels 205 are read out than expected, the logic gate 310 transmits an error condition (720). The error condition may then be transmitted to the image signal processor 125 to instruct the image signal processor 125 to disregard the pixel data and/or retrieve new pixel data.

If the counter does not count down to zero (710), this suggests that an error has not occurred (725). In this case, the counter 305 is reset (730) prior to read out of the next line or frame of pixels 205 (710).

Figure 8:
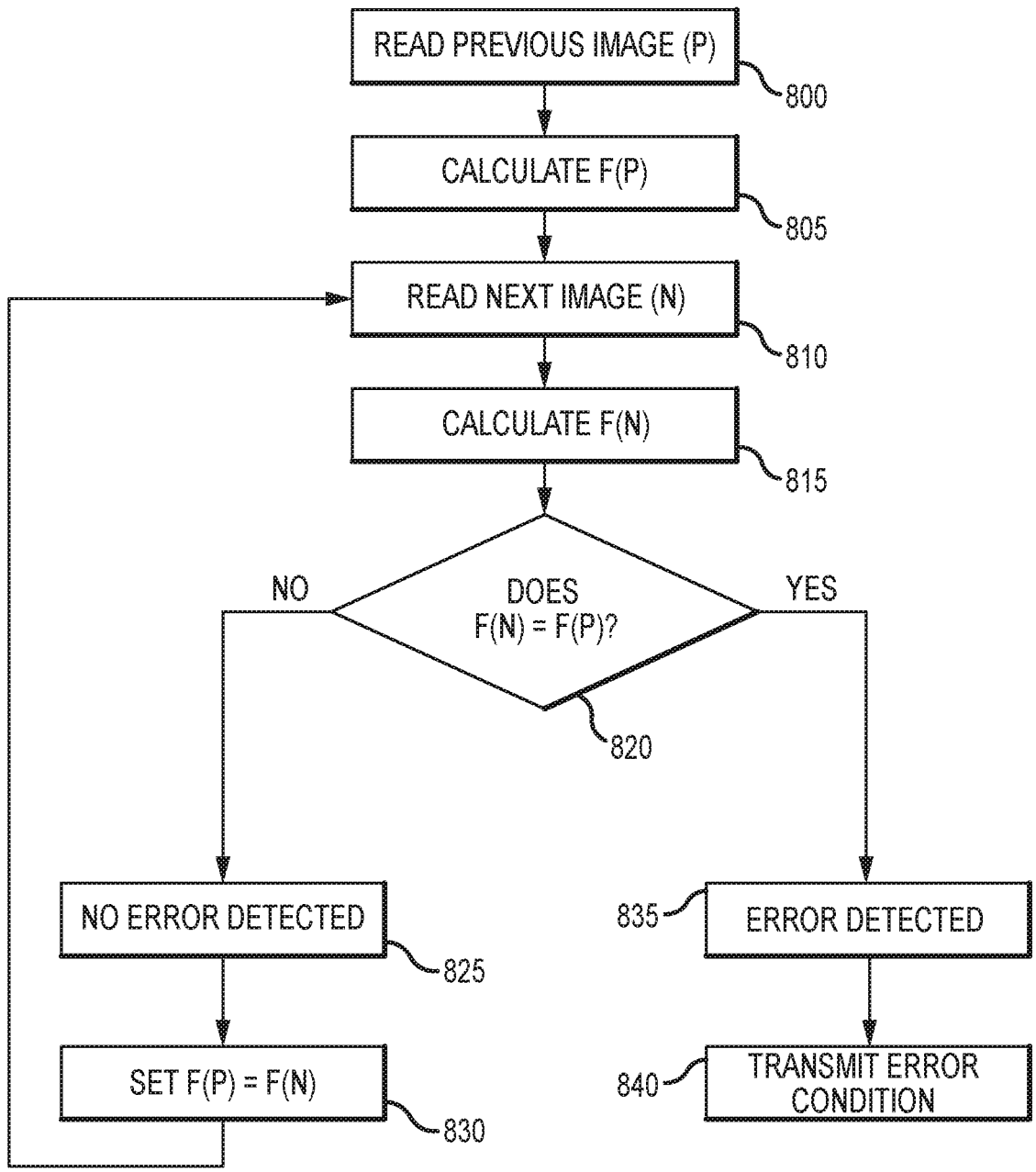
FIG. 8 is a flow chart in accordance with an exemplary embodiment of the present technology.

In an alternative or additional operation and referring to FIGS. 4 and 8 the fingerprint calculation unit 400 calculates a unique fingerprint for a frame or frame portion, such as even-numbered rows. The fingerprint calculation unit 400 generates a fingerprint with B bits. The fingerprint value may be an intermediate result which is continuously updated as the pixel data is received.

After the last pixel data is received, the completed fingerprint value F(N) for the image or image portion is available for use (810, 815). An end-of-frame (EOF) signal enables the first register 405 to receive the fingerprint value. At substantially the same time, the fingerprint value F(P), which is calculated in the same manner (805), from a previous frame or frame portion (800) is transmitted from the first register 405 to the second register 410.

The values F(N), F(P) stored in each of the first and second registers 405, 410 are transmitted as first and second values X, Y to the first and second input terminals 540, 545 of the comparator 415 and the values, where F(P)=X, and F(N)=Y, are compared. If the values X, Y are equal (X=Y) (820), this suggests that identical pixel data has been used to calculate the fingerprints for the previous frame and current frame, which means that some error has occurred within the system, as the pixel data that is selected for comparison should be non-identical pixel data. Images of still scenes will result in non-identical pixel data because of noise variations introduced in each capture. As such, the comparator 415 generates an error condition (835). The error condition may then be transmitted to the image signal processor 125 to instruct the image signal processor 125 to disregard the pixel data and/or retrieve new pixel data.

If the values X, Y are not equal (X≠Y) (820), this suggests that non-identical pixel data has been used to calculate the fingerprints for the previous frame F(P) and current frame F(N), which is desired, and therefore no errors are detected (825).

In an alternative or additional operation and referring to FIG. 5, the error detection circuit 130 may detect whether the pixel data from one frame is being repeated, rather than obtaining new pixel data from a consecutive frame. If the pixel data is being repeated, this suggests that an error has occurred in the system, as the system should be continuously receiving new pixel data. In the present embodiment, the error detection circuit 130 may comprise the fingerprint calculation unit 400 to calculate a unique fingerprint for a frame or frame portion, such as even-numbered rows. The fingerprint calculation unit 400 generates a fingerprint with B bits. The fingerprint value may be an intermediate result which is continuously updated as the pixel data is received.

After the last pixel data is received, the completed fingerprint value for the image or image portion is available for use. An end-of-frame (EOF) signal enables the first register 405 to receive the fingerprint value. At substantially the same time, the fingerprint value from a previous frame or frame portion is transmitted from the first register to the second register.

The values stored in each of the first and second registers 405, 410 are transmitted as first and second values X1, Y1 to the first and second input terminals 540, 545 of the first comparator 515, and the values X1, Y1 are compared. If the values X1,Y1 are equal (X1=Y1), the second output terminal 555 generates a high value, and if the values X1,Y1 are not equal (X1≠Y1), then the first output terminal 550 generates a high value. The AND gate 525 samples the output values of the first comparator 515 when the EOF signal is enabled. The counter 530 is incremented by 1 for each instance where the second output terminal 555 generates a high value, for example when the values X1,Y1 are equal (X1=Y1). If the fingerprint values do not match (i.e., X1≠Y1), the counter 530 is cleared and the counter starts over at zero. The second comparator 535 receives a value X2 from the counter 530 and compares the output value of the counter 530 to the predetermined parameter Y2. If the counter output value X2 equals the predetermined parameter Y2(X2=Y2), this suggests that pixel data has been repeated, and that new pixel data has not been obtained, read out, or processed correctly.

If matching fingerprints are identified for a series of frames, an error condition is generated, since real-time image sequences should produce non-identical pixel data, and thus should have non-identical fingerprints. The error condition may then be transmitted to the image signal processor 125 to instruct the image signal processor 125 to disregard the pixel data and/or retrieve new pixel data.

In various embodiments, the error detection circuit 130 may use two or more frames or frame portions to determine if an error has occurred. For example, the fingerprint calculation unit 400 may assign unique fingerprints for three frames of image data, such that all three fingerprints are compared. As such, the illustrated embodiments may be modified to accommodate additional frames or frame portions of pixel data, for example by incorporating additional logic gates, comparators, registers, and the like. Additionally, various embodiments may utilize a single channel of a multichannel image, such as a green channel of an RGB image, or the luminance channel of a YUV or YCbCr image.

Although various embodiments have been illustrated with hardware implementations, it is understood that some portion or all of the components may be realized by software implementations.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

While the technology has been described with reference to specific exemplary embodiments, various modifications and changes may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A system for detecting errors in image data, comprising: a pixel array comprising a plurality of pixels configured to capture an image and generate an image frame comprising a frame of pixel data;
   an image processing unit, coupled to the pixel array and configured to receive the frame of pixel data generated by the pixels, comprising:
      an error detection circuit configured to detect an error condition based on a count value corresponding to individual pixel data transmissions from the frame of pixel data;
      wherein the image processing unit initiates a process to capture and receive new pixel data in response to at the detected error condition; and
   an embedded system coupled to the image processing unit to receive output data from the image processing unit,
   wherein the error detection circuit comprises: a register configured to store a predetermined value, wherein the predetermined value is greater than the number of pixels in the pixel array;
   an N-bit counter connected to the reaister and configured to receive the predetermined value and generate N bits that represent the count value; and
   a logic circuit connected to an output terminal of the N-bit counter and configured to receive each bit of the N-bit count value individually and generate a single output signal according to each bit.

2. The system of claim 1, wherein the error detection circuit comprises:
   a clock for generating clock cycles, wherein each clock cycle corresponds to one pixel data transmission;
   a counter for counting the number pixel data transmissions; and
   a register programmed with a maximum value, wherein the maximum value is greater than or equal to the number of clock cycles needed to transmit pixel data from all pixels in the pixel array.

3. The system of claim 1, wherein the error condition comprises at least one of a pixel data read out error, a pixel data retrieval error, and a pixel data storage error.

4. A method for detecting errors in an imaging system, comprising: generating a frame of pixel data from a pixel array;
   transmitting the frame of pixel data to an error detection circuit; performing error analysis on the frame of pixel data with the error detection circuit using count values corresponding to individual pixel data transmission per frame;

generating an error signal with the error detection circuit to indicate an error condition;

operating an image signal processor according to the error signal, where the image signal processor indicates a process to capture and receive new pixel data in response to the error signal; and preventing use of the second pixel data in response to the error signal, wherein performing error analysis with the error detection circuit comprises:

receiving a predetermined value. wherein the predetermined value is greater than the number of pixels in the pixel array;

receiving a clock signal that corresponds to a single pixel data transmission;

counting down from the predetermined value according to the clock signal; and generating N bits that represent the count value.

5. The method of claim 4, wherein performing error analysis with the error detection circuit comprises:

transmitting the pixel data to an image processing unit on a one pixel per clock cycle basis;

counting the number of clock cycles needed to transmit the pixel data; and comparing the number of clock cycles to a maximum value.

6. The method of claim 5, wherein the error signal is generated if the number of clock cycles is greater than the maximum value.

7. An apparatus for error detection, comprising: an imaging system comprising:

a pixel array comprising a plurality of pixels configured to capture an image and generate an image frame comprising a frame of pixel data;

an error detection circuit coupled to the pixel array and configured to: receive the frame of pixel data;

measure a readout time for the frame of pixel data based on a count value corresponding to individual pixel data transmissions per frame; and generate an error signal based on the measured readout time; and an embedded system coupled to the imaging system and responsive to the error signal;

wherein the error signal prevents the embedded system from using the frame of pixel data, wherein the error detection circuit comprises: a register configured to store a predetermined value, wherein the predetermined value is greater than the number of pixels in the pixel array; and an N-bit counter connected to the register and configured to receive the predetermined value and generate N bits that represent the count value.

8. The apparatus of claim 7, wherein the error detection circuit comprises:

a clock for generating clock cycles, wherein each clock cycle corresponds to one pixel data transmission;

a counter for counting the number of clock cycles; and a register programmed with a maximum value, wherein the maximum value is greater than or equal to the number of clock cycles needed to transmit pixel data from all pixels in the pixel array.

9. The apparatus of claim 7, wherein the error signal corresponds to at least one of a pixel data read out error, a pixel data retrieval error, and a pixel data storage error.

10. The system of claim 1, wherein the N-bit counter comprises a first input terminal and a second input terminal, and is configured to:

receive a sync signal at the first input terminal and begin counting in response to the sync signal; and receive a clock signal at the second input terminal and generate the N-bit count value according to the clock signal, wherein the clock signal corresponds to a single data transmission.

11. The system of claim 10, wherein the N-bit counter counts down from the predetermined value according to the clock signal.

12. The method of claim 4, wherein performing error analysis with the error detection circuit further comprises:

receiving a sync signal;

beginning counting in response to the sync signal; and generating a signal output signal according to the N bits.

13. The apparatus of claim 7, wherein the N-bit counter comprises a first input terminal and a second input terminal, and is configured to:

receive a sync signal at the first input terminal and begin counting in response to the sync signal; and receive a clock signal at the second input terminal and generate the N-bit count value according to the clock signal, wherein the clock signal corresponds to a single pixel data transmission.

14. The apparatus of claim 13, wherein the N-bit counter counts down from the predetermined value according to the clock signal.

* * * * *

UNITED STATES PATENT AND TRADEMARK OFFICE
CERTIFICATE OF CORRECTION

PATENT NO. : 11,109,016 B2
APPLICATION NO. : 15/263110
DATED : August 31, 2021
INVENTOR(S) : Clark et al.

It is certified that error appears in the above-identified patent and that said Letters Patent is hereby corrected as shown below:

In the Claims

In Column 12, Line 43, Claim 1, delete "reaister" and insert -- register --, therefor.

Signed and Sealed this
Fifteenth Day of November, 2022

Katherine Kelly Vidal
*Director of the United States Patent and Trademark Office*